May 26, 1953  E. C. WEBB  2,639,681

COAL CONDITIONING AND CONVEYING MEANS

Filed Sept. 29, 1948  4 Sheets-Sheet 1

INVENTOR
ERNEST C. WEBB

BY
ATTORNEY

May 26, 1953 — E. C. WEBB — 2,639,681
COAL CONDITIONING AND CONVEYING MEANS
Filed Sept. 29, 1948 — 4 Sheets-Sheet 2
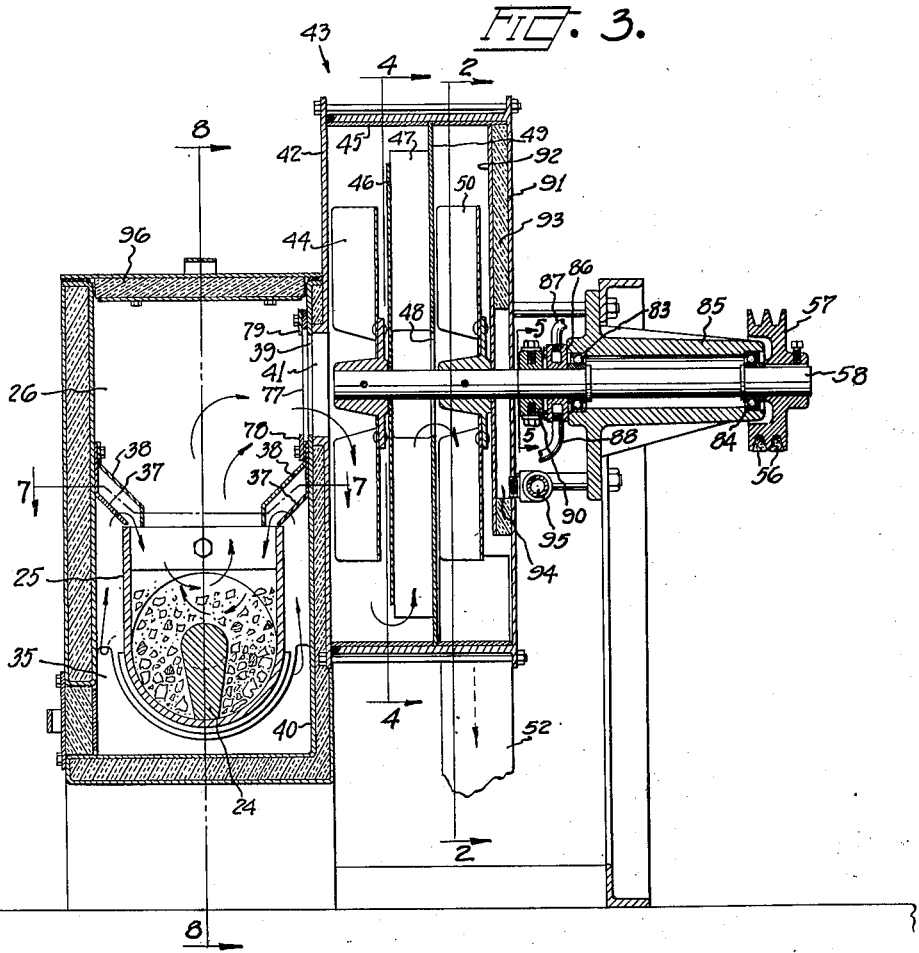
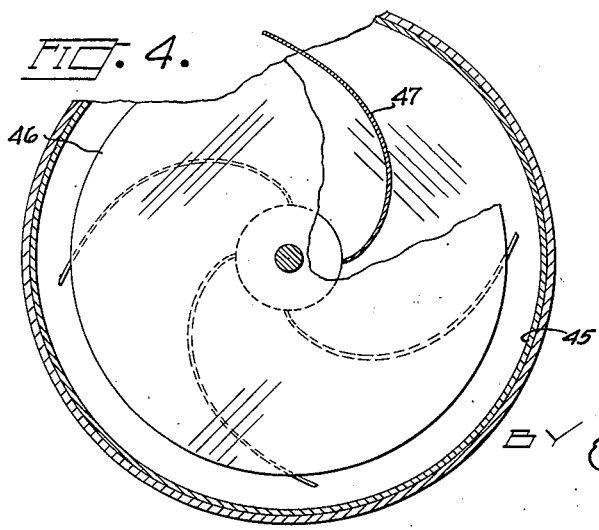
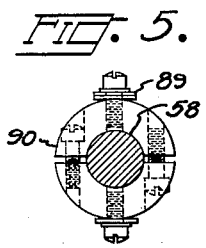
INVENTOR
ERNEST C. WEBB
ATTORNEY May 26, 1953      E. C. WEBB      2,639,681
COAL CONDITIONING AND CONVEYING MEANS
Filed Sept. 29, 1948      4 Sheets-Sheet 3
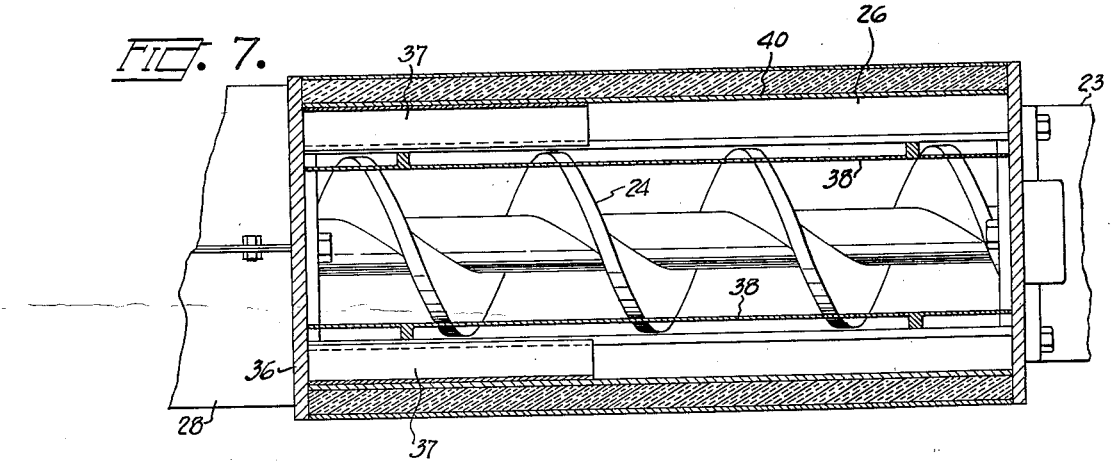
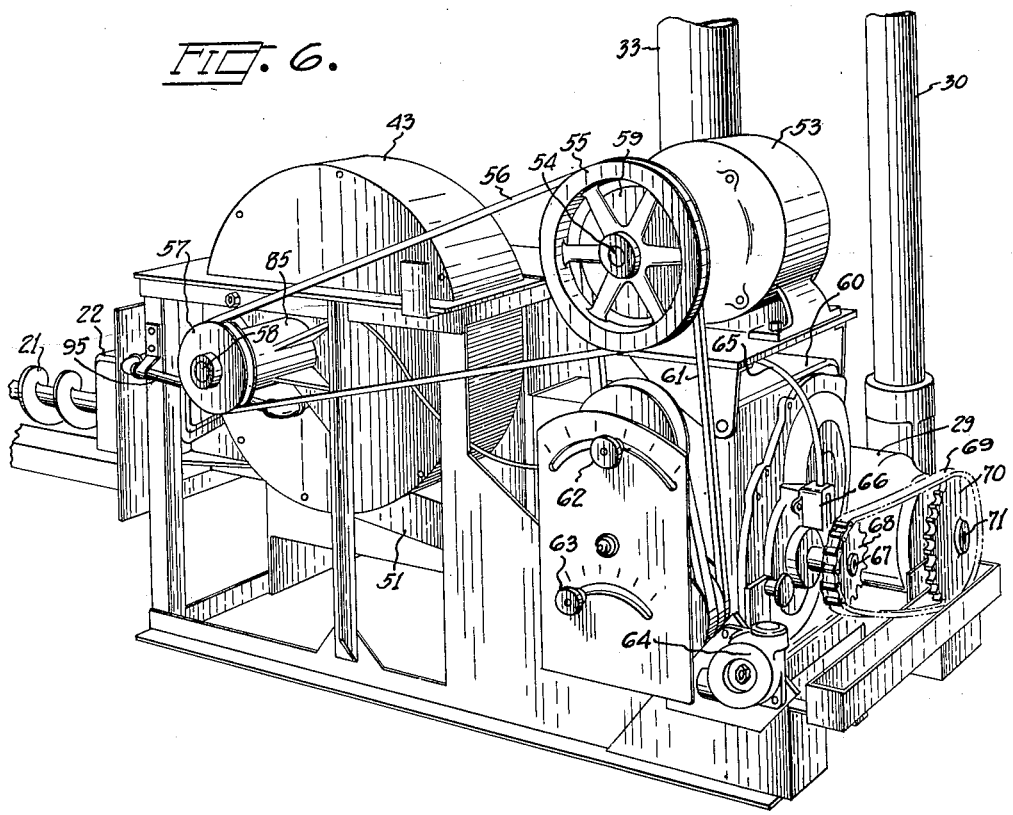
INVENTOR
ERNEST C. WEBB
BY
ATTORNEY May 26, 1953  E. C. WEBB  2,639,681
COAL CONDITIONING AND CONVEYING MEANS
Filed Sept. 29, 1948  4 Sheets-Sheet 4
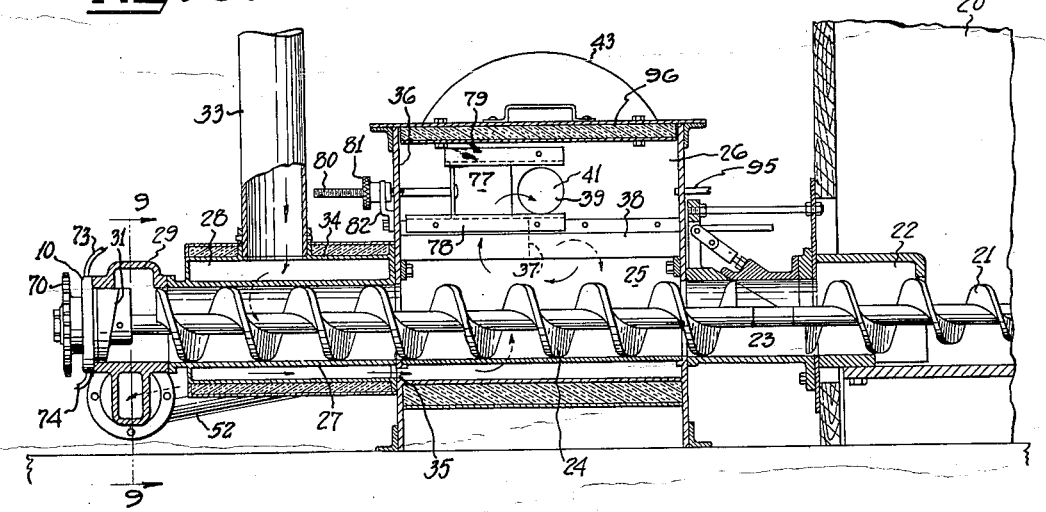
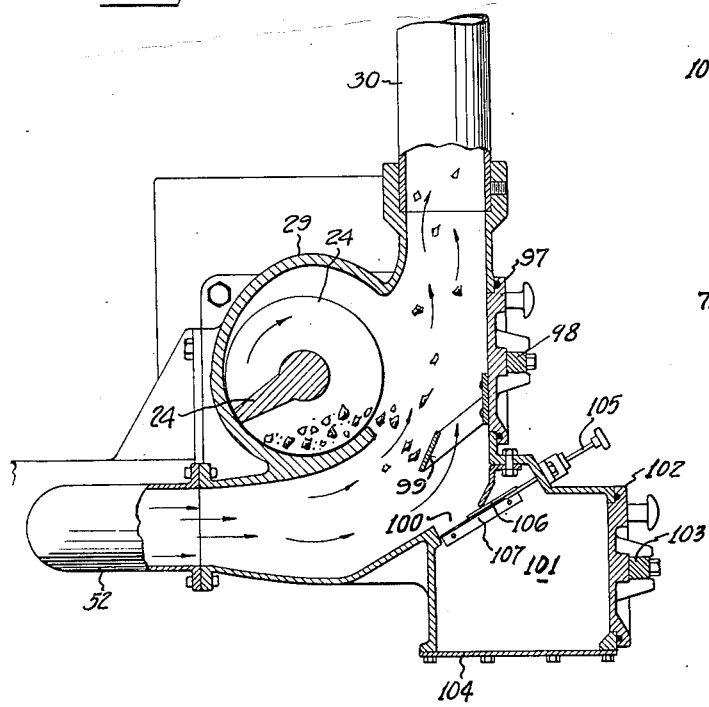
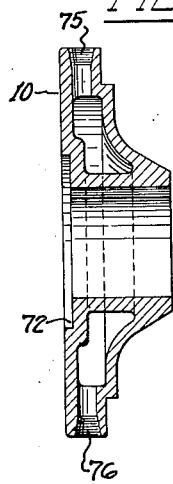
INVENTOR
ERNEST C. WEBB
BY
ATTORNEY Patented May 26, 1953

2,639,681

UNITED STATES PATENT OFFICE 2,639,681

COAL CONDITIONING AND CONVEYING MEANS

Ernest C. Webb, Bay Village, Ohio, assignor to Iron Fireman Manufacturing Company, Cleveland, Ohio Application September 29, 1948, Serial No. 51,672

1 Claim. (Cl. 110—104)

This invention relates generally to coal burning, and the feeding of a coal fired furnace by means of a pneumatic spreader stoker. More particularly this invention relates to the improvement of the coal conditioning and conveying means which is the basic structure of a successful pneumatic spreader stoker.

It should be understood that for the pneumatic coal conveyor of such a stoker to be reliable in operation larger pieces of relatively non-breakable material, such as iron bolts or mine spikes, should be removed from the coal as early as possible on its way from the coal bin to the furnace and that smaller pieces of relatively heavier material, such as metal or stone, must be sidetracked before they might enter the pneumatic conveyor. Also the coal temperature should be elevated to prevent its adherence to the walls of the pneumatic conveyor housing as well as to put it in better condition for rapid ignition on reaching the furnace.

Conditioning the coal is thus understood to means the removal of foreign matter, including excess moisture, which might cause the clogging of the conveyor, and the raising of the temperature of the coal to promote its rapid ignition.

An essential part of coal conditioning for pneumatic conveying is heating of the coal and vaporizing the excess moisture therefrom. To reduce the space required and the cost of more satisfactory equipment, various attempts have been made to heat all or strategic portions of the conveyor externally and thus progressively to condition the coal as it travels through the externally heated conveyor. This external heating of the conveyor has been accomplished by various means, such as steam or hot gas jacketing of the conveyor. Also, either as an adjunct to the external heating or as an only effort, hot gas from the furnace has been used as the conveying medium for carrying the coal. In either case it is seen that the coal enters the pneumatic conveyor unconditioned and its initial progress through the conveyor will be critically unreliable.

It is an overall object of this invention to combine with the pneumatic conveyor, in a compact and economical way, means for removing the solid foreign matter from the coal stream and also to moisture condition the coal to such an extent before the coal enters the pneumatic conveyor that mechanical stoppages of the conveyor will be avoided, and then to finish the moisture conditioning of the coal during its travel through the pneumatic conveyor. By this means the conveyor is made reliable regardless of its length.

The novelty and the utility of this invention lies in the design and arrangement of the parts and the combination of parts which are provided to accomplish the above overall object as will be made clear by reference to the attached drawings and the following description thereto.

In the drawings:

Fig. 3 is a vertical section along the line 3—3 of Fig. 1.

Fig. 4 is a vertical section along the line 4—4 of Fig. 3.

Fig. 5 is an elevation along the line 5—5 of Fig. 3.

Fig. 6 is a perspective view of a pneumatic spreader stoker drive as applied to the combination of this invention.

Fig. 7 is a section along the line 7—7 of Fig. 3.

Fig. 8 is a section along the line 8—8 of Fig. 3.

Fig. 9 is a section along the line 9—9 of Fig. 8.

Fig. 10 is a vertical section through the water cooled bearing numbered 10 in Fig. 8.

Like numbers denote like elements in the several figures.

Figure 1:
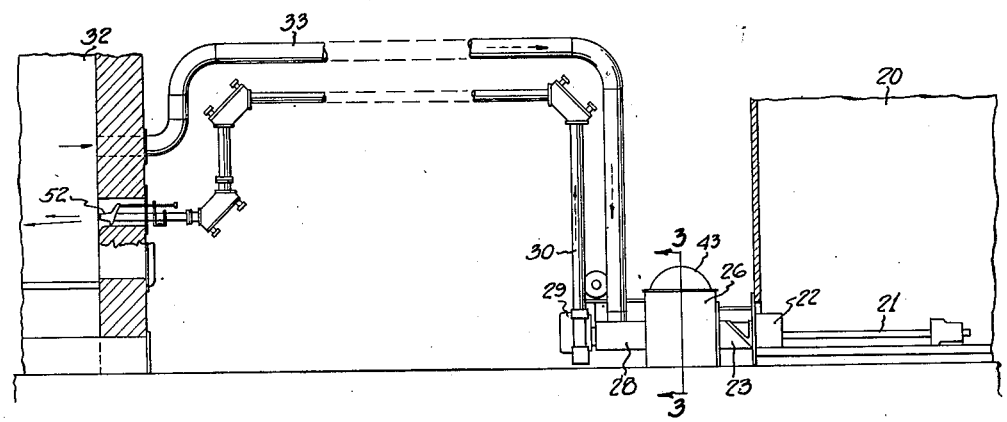
Fig. 1 shows, in side elevation, the general arrangement of coal bin, furnace, and stoker, the conveying and coal conditioning parts of which are combined in this invention.
Figure 2:
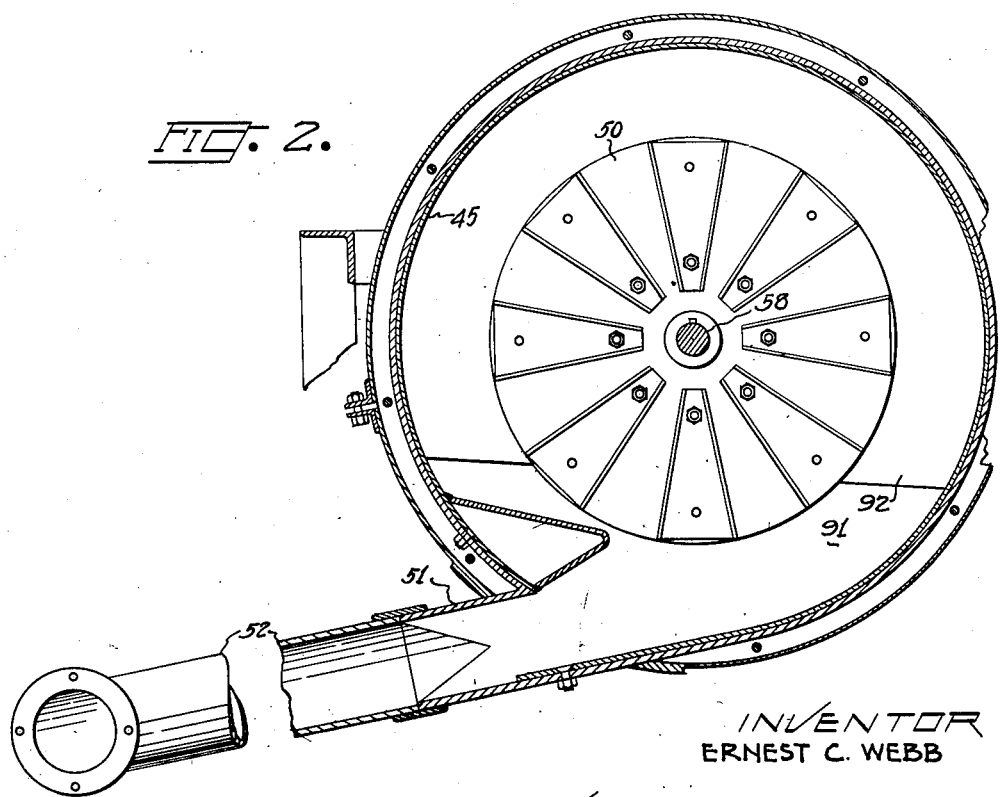
Fig. 2 shows a transverse vertical section through the hot gas fan.

In Fig. 1, a pneumatic spreader stoker is shown in its usual installed relation to a coal bin and a furnace. In operation, coal (not shown) would be withdrawn from a coal bin 20 by the bin end 21 of a screw conveyor through a coal dressing section 22 and a spike clean out section 23 where, by the omission of a section of flight from the screw conveyor (see Fig. 8) the coal travel will be sufficiently slowed up for the coal to be compacted substantially gas tight in this section of the conveyor. From the clean out section 23, the feeder section 24 of the coal screw conveys coal through the open topped section 25 of the conveyor housing which traverses the main section 26 of the coal dryer and through the closed conveyor housing 27 which traverses the hot gas inlet section 28 of the drier and into the transfer housing 29 where the coal is transferred from the screw conveyor to the first riser section 30 of the pneumatic conveyor. Note that, in the transfer housing, the screw conveyor flight is discontinuous and the coal discharging off the forwardly directed flight crowds against a short section 31 of rearwardly directed flight thus causing the coal to unload from the screw conveyor into the transfer housing with enough reluctance to pack the coal substantially gas tight at the discharge end of screw 24.

Hot gas from the furnace 32 traverses insulated hot gas pipe 33 and enters drier inlet section 28 through a hole in top plate 34 to which pipe 33 is sealed. The hot gas surrounds conveyor housing 27 in drier inlet section 28 and then enters main drier section 26 through hole 35 (see Figure 3) in front plate 36 of main drier section 26. In main drier section 26 (see Figs. 3, 7 and 8) the hot gas surrounds open top conveyor housing 25 at its bottom and sides. Baffles 37 prevent the hot gas from rising above the sides of the open top conveyor housing 25 at the inlet end of the main section of the drier but as the gas passes further into the drier it passes the ends of baffles 37 and is intercepted by full length baffles 38 which deflect the hot gases back down onto the coal in the open top conveyor housing 25 throughout the full length of main drier section 26. After impinging downwardly onto the top of the coal in conveyor housing 25, the hot gas rises into the upper portion of main drier section 26 from where it passes through the hot gas outlet 39 in side plate 40 of main drier section 26 and through inlet 41 in front plate 42 of two stage hot gas fan 43 and onto the first stage fan wheel 44 along which it is discharged outwardly against replaceable fan housing liner 45. The hot gas then proceeds axially of the fan around stationary baffle disk 46 and back radially through re-entrance stationary blades 47 to the inlet opening 48 in separator plate 49 and onto the second stage fan wheel 50 from which the hot gas is discharged outwardly and proceeds from the fan casing outlet 51 into hot gas duct 52 and thence to transfer housing 29 where the high velocity hot gas picks up the coal discharged from coal screw 24 and carries it through pneumatic conveyor line 30 and on to nozzle 52 from where the coal and hot gas are discharged into furnace 32.

Electric motor 53 through shaft 54, motor sheave 55 and belt 56 drives fan sheave 57 keyed to fan shaft 58. Between motor 53 and sheave 55 a centrifugal clutch of the mercury type well known in the art and identified as Model 4512, Type C of the Mercury Clutch Corporation of Canton, Ohio, is mounted with one part fixed to shaft 54 and the other fixed to motor sheave 59 which drives gear box 60 through belt 61. The function of the mercury clutch is to delay the starting of the gear box which drives the coal screw conveyor until the motor shaft has attained about two thirds of full speed at which time the hot gas fan is also going fast enough to insure the proper operation of the pneumatic coal conveyor. On stopping the motor the coal screw conveyor will stop with the motor at about two thirds full speed and the fan will continue to run long enough to clear the pneumatic conveyor and leave it in condition to start again without blocking.

Gear box 60 is continuously variable in output speed from about ten per cent of full speed in reverse to full speed in the forward direction.

The U. S. patent application of Richard C. Wright on an "Industrial Stoker Drive," Serial No. 744,392, filed April 28, 1947, and now Patent No. 2,578,650, is a complete exposition of gear box 60 and explains the speed control by the movement of knob 62 and the control of the coal-air ratio of the stoker by the knob 63. A special pipe elbow 64 encloses a tiller rope sheave for changing the direction of the pipe enclosed tiller rope used for remote control of the stoker. Wires 65 connect the motor with the overload release switch 66 of this Wright mechanism.

Variable speed output shaft 67 of gear box 60 drives coal screw conveyor shaft 71 through sprockets 68 and 70 and roller chain 69. The thrust of coal conveyor screw 21, 24, 71 is taken on transfer housing 29 through sprocket 70 which bears against an oilless thrust washer fitting the recess 72 in water cooled bearing 10 which bolts to one side transfer housing 29. Pipes 73 and 74 screwed respectively into tapped openings 75 and 76 of bearing 10 conduct water to and from the interior thereof.

Coal dressing section 22 of the coal screw conveyor is shown and claimed in U. S. patent application by E. C. Webb, on a "Coal Conveyor," Serial No. 727,631, filed February 10, 1947, and now Patent No. 2,531,928. The spike clean-out section 23 of the coal screw conveyor is essentially that shown and claimed in my U. S. Patent #1,967,693, on a "Fuel Feed Mechanism for Underfeed Stokers," issued July 24, 1934.

Referring again to hot gas fan 43, the amount of gas handled is governed by inlet damper 77 slidably supported between plate 40 and guides 78 and 79. The position of damper 77 is governed by damper stem 80 threaded into hand wheel nut 81 rotatably supported on bracket 82 fixed to plate 36. Hot gas fan shaft 58 is rotatably mounted on bearings 83 and 84 carried in bearing housing 85 supported as shown. Water cooled, hollow bearing retainer 86, secured to housing 85, receives and gives up cooling water through pipes 87 and 88 respectively. Should the balance of fans 44 and 50 on shaft 58 become impaired, due to heat distortion or erosion, the number of balancing washers 89 and the angular position of split balancing collar 90 may each be adjusted to bring the fan system back into proper rotating balance.

As shown in the drawings by alternate double broken line and single solid line hatching, most of the outer surfaces of the hot gas fan and drier sections are insulated to retain the hot gas heat within the system.

Between back plate 91 and liner plate 92, the block of insulation 93 is cut away to form a collecting recess 94 for hot gas and dust which may be forced through the clearance hole in plate 92 for shaft 58. Recess 94 is relieved of gas pressure by the pipe 95 whose other end opens into drier section 26. The consequent low pressure in recess 94 allows atmospheric air to leak through the clearance hole for shaft 58 in plate 91.

Removably sealed and insulated cover 96 on drier section 26 allows ready inspection of the drier interior.

In following the progress of the coal from the bin to the furnace as above explained and also in following the progress of hot gas used as the pneumatic conveying medium, it should be noted that in the drier section the flow of hot gas is counter to the flow of coal and in the pneumatic conveying section the flow of hot gas is parallel to the flow of coal. It should also be noted that while the pressure in the coal bin and in the furnace is close to the instant atmospheric pressure, the pressure in the drier section is substantially below the instant atmospheric pressure and that the pressure within the system at the region of coal transfer from the screw conveyor to the pneumatic conveyor is substantially above the instant atmospheric pressure. As previously explained, these pressure drops are maintained by the compacted coal in the sections 23 and 27 of the screw conveyor. However, the flow of air to the hot gas fan from the bin 20 and the flow of hot gas to the fan from transfer sections 29 is not entirely eliminated, and it is seen that these leakages on the one hand prevent overheating of coal near the bin and on the other add to the drying effect on the coal on its way to the transfer section. Should coal be encountered which has too small a percentage of fines to maintain the above pressure drops as desired, the open top of the screw conveyor housing in section 26 of the drier can be partially or completely closed with the desired length of conveyor top closing plates (not shown) which may be readily inserted into position by removing the drier top access cover 96.

Referring now to the transfer section 29, a gasketed cover 97 closes an inspection opening in body 29 and is held in place by a cross bar 98 secured to cover 97 and latched at each end to ears fixed to body 29. A transverse baffle 99, conveniently fixed to cover 97, serves the double purpose of aiding in turning the incoming hot gas to a vertical direction of flow and also in directing the downward fall of heavier pieces of foreign matter which have entered with the coal. It is understood (see Fig. 9) that the rotation of the coal screw is clockwise and that as coal is discharged from the screw conveyor, it would have a freely falling motion downward and to the right. Also as the hot conveying gas enters body 29, it has a high velocity to the right and, as it meets the coal, it has both a high velocity vertical component and an effective horizontal component to the right. Thus coal pieces having a rather definite density will be entrained in the stream of hot gas and be carried upwardly and into conveyor tube 30. However, pieces of rock, iron, etc., of greater density will be pushed rightwardly and, if too heavy to be carried by the hot gas stream, will fall downwardly along cover 97 and, more or less guided by baffle 99, will fall through opening 100 in the partition separating the foreign matter trap section 101 from the main transfer section of body 29. Trap section 101 has a gasketed cover 102 closing a cleaning opening as shown and held in place by a cross bar 103 secured to cover 102 and latched at its ends to ears fixed to body 29. Bottom cover plate 104 completes the closure of traps section 101. Push rod 105 secured to sliding gate 106 supported at its sides on inclined guides 107 fixed to body 29 can be manipulated to close or open opening 100 at will. Normally, gate 106 is retracted and opening 100 is clear for the free passage of foreign material into trap 101 but periodically gate 106 is closed, cover 102 is removed and the foreign material is removed from trap 101. This can be done without interfering with the continuous operation of the stoker.

From the drawings and the preceding explanation thereof, it will be apparent that I have provided a unique combination of coal conditioning and conveying means for a pneumatic spreader stoker which will be reliable in operation and free of excessive maintenance and which is capable of an improved method of operation to obtain these desirable results. While my unique combination is formed of many parts or several groups of parts unique in themselves, it is apparent that the desired results are obtained by the interaction both simultaneously and successively of these various parts.

I am aware that this is an old art and that many attempts have been made to produce a pneumatic spreader stoker which could be successfully and reliably operated under the varying conditions found in their use. Yet I am unaware of any previous mechanisms which will operate with the overall reliability, flexibility, and limited maintenance that the combination of my invention achieves.

I make no claims to the elements I have used and which come from the previous art but I do intend to claim and hold for myself those combinations and sub-combinations which comprise my invention even though they be somewhat modified from the explicit form in which I have here shown them for example.

I claim:

In a pneumatic spreader stoker adapted to take coal from a coal storage means and condition said coal as it transports said coal from said coal storage means to a furnace, a pneumatic conveyor, means for propelling coal conditioning and conveying gas through said pneumatic conveyor, a screw-type conveyor, and means for driving said screw-type conveyor, said pneumatic conveyor comprising a coal transfer section having a horizontally extending conveying gas inlet leg, a vertically extending conveying gas outlet leg, means forming a first chamber within the angle of said legs, means forming a second chamber outside the angle of said legs, means forming an opening between said first chamber and the interior of said vertical leg, means forming an opening between said second chamber and the interior of both said legs, a gate manually positionable to close said last mentioned opening and means adapting said screw conveyor to discharge coal into said first chamber.

ERNEST C. WEBB.

References Cited in the file of this patent

UNITED STATES PATENTS

| Number | Name | Date |
| --- | --- | --- |
| 430,652 | Jarrett | June 24, 1890 |
| 540,114 | Schmitz | May 28, 1895 |
| 1,062,259 | Seddon | May 20, 1913 |
| 1,412,031 | Vallentyne | Apr. 4, 1922 |
| 1,450,903 | Newhouse | Apr. 3, 1923 |
| 1,495,479 | Grindle | May 27, 1924 |
| 1,843,167 | Lucke | Feb. 2, 1932 |
| 1,959,864 | Hartley | May 22, 1934 |
| 2,313,956 | McCrane | Mar. 16, 1943 |
| 2,319,935 | Lower | May 25, 1943 |
| 2,350,910 | Lower | June 6, 1944 |
| 2,441,736 | Webb | May 18, 1948 |